(12) United States Patent
Kim et al.

(10) Patent No.: US 7,486,644 B2
(45) Date of Patent: Feb. 3, 2009

(54) METHOD AND APPARATUS FOR TRANSMITTING AND RECEIVING DATA WITH HIGH RELIABILITY IN A MOBILE COMMUNICATION SYSTEM SUPPORTING PACKET DATA TRANSMISSION

(75) Inventors: Young-Bum Kim, Seoul (KR); Yujian Zhang, Haidian Distric Beijing (CN); Ju-Ho Lee, Suwon-si (KR); Yong-Jun Kwak, Yongin-si (KR); Youn-Hyoung Heo, Suwon-si (KR); Joon-Young Cho, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 617 days.

(21) Appl. No.: 11/289,572

(22) Filed: Nov. 30, 2005

(65) Prior Publication Data

US 2006/0156184 A1 Jul. 13, 2006

(30) Foreign Application Priority Data

Dec. 1, 2004 (KR) ...................... 10-2004-0099917
Dec. 22, 2004 (KR) ...................... 10-2004-0110552
Jan. 27, 2005 (KR) ...................... 10-2005-0007437

(51) Int. Cl.
*H04B 7/216* (2006.01)
(52) U.S. Cl. ....................... 370/335; 370/355; 714/776; 714/790; 714/802
(58) Field of Classification Search ................ 370/335, 370/355; 375/152; 714/776, 790, 802
See application file for complete search history.

(56) References Cited

U.S. PATENT DOCUMENTS

2002/0170013 A1 11/2002 Bolourchi et al.

2003/0133497 A1* 7/2003 Kinjo et al. ................. 375/152

FOREIGN PATENT DOCUMENTS

| EP | 1 339 188 A1 | 8/2003 |
| JP | 11502679 | 3/1999 |
| JP | 2004527949 | 9/2004 |
| WO | WO03085873 | 10/2003 |

OTHER PUBLICATIONS

LG Electronics, Performance of E-AGCH signaling in HSUPA, 3GPP TSG RAN WGI Meeting #39, Shin-Yokohama, Japan, Nov. 15-19, 2004.
NTT DOCOOMO, Performance of Common Absolute Grants: 2ms vs. 10ms (5 times repetition of 2ms),, TSG-RAN Working Group 1 #39 meeting, Shin-Yokohama, Japan, Nov. 15-19, 2004.
Hagenauer J Ed; Institute of Electrical And Electronics Engineers: "Hybrid ARQ/FEC Protocols On Fading Channels Using Rate Compatible Punctures . . . "; pp. 744-748.

* cited by examiner

*Primary Examiner*—Temica M Beamer
(74) *Attorney, Agent, or Firm*—Roylance, Abrams, Berdo & Goodman, L.L.P.

(57) ABSTRACT

A method and apparatus for transmitting control information of a small block size with high reliability in a mobile communication system supporting uplink packet data service are provided. A 6-bit Absolute Grant indicating an allowed maximum data rate for uplink packet data transmission is generated and a 16-bit User Equipment Identifier Cyclic Redundancy Check is generated by combining a Cyclic Redundancy Check with a User Equipment Identifier. The User Equipment Identifier specific Cyclic Redundancy Check and 8 tail bits are added to the 6-bit Absolute Grant and the added bits are encoded at a coding rate of 1/3. The resulting 90 coded bits are rate-matched according to a predetermined rate matching pattern and transmitted to a User Equipment. The rate matching pattern is {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

16 Claims, 5 Drawing Sheets

METHOD AND APPARATUS FOR TRANSMITTING AND RECEIVING DATA WITH HIGH RELIABILITY IN A MOBILE COMMUNICATION SYSTEM SUPPORTING PACKET DATA TRANSMISSION

CROSS REFERENCE TO RELATED APPLICATIONS

This application claims priority under 35 U.S.C. § 119(a) to an application entitled "Method and Apparatus for Transmitting and Receiving Data with High Reliability in a Mobile Communication System Supporting Packet Data Transmission" filed in the Korean Intellectual Property Office on Dec. 1, 2004 and assigned Ser. No. 2004-99917, to an application entitled "Method and Apparatus for Transmitting and Receiving Data with High Reliability in a Mobile Communication System Supporting Packet Data Transmission" filed in the Korean Intellectual Property Office on Dec. 22, 2004 and assigned Ser. No. 2004-110552, and to an application entitled "Method and Apparatus for Transmitting and Receiving Data with High Reliability in a Mobile Communication System Supporting Packet Data Transmission" filed in the Korean Intellectual Property Office on Jan. 27, 2005 and assigned Ser. No. 2005-7437, the entire disclosures of all three of which are hereby incorporated by reference.

BACKGROUND OF THE INVENTION

1. Field of the Invention

The present invention relates generally to a mobile communication system supporting packet data service. More particularly, the present invention relates to a method and apparatus for transmitting control information required for Hybrid Automatic Repeat request (HARQ).

2. Description of the Related Art

Universal Mobile Telecommunication Service (UMTS), which is a 3rd generation mobile communication system using Wideband Code Division Multiple Access (WCDMA) based on the European Global System for Mobile communications (GSM) system and General Packet Radio Services (GPRS), provides mobile subscribers or computer users with a uniform service of transmitting packet-based text, digitized voice, and video and multimedia data at or above 2 Mbps irrespective of their locations around the world.

Particularly the UMTS system uses a transport channel called Enhanced Uplink Dedicated CHannel (E-DCH or EUDCH) in order to further improve the packet transmission performance of uplink communications from a User Equipment (UE) to a Node B (interchangeable with a base station). For more stable high-speed data transmission, Adaptive Modulation and Coding (AMC), HARQ, shorter Transmission Time Interval (TTI), and Node B-controlled scheduling were introduced for the E-DCH transmission.

AMC is a technique of determining a Modulation and Coding Scheme (MCS) adaptively according to the channel status between the Node B and the UE. Many MCS levels can be defined according to available modulation schemes and coding schemes. The adaptive selection of an MCS level according to the channel status increases resource use efficiency.

HARQ is a packet retransmission scheme for retransmitting a packet to correct errors in an initially transmitted packet. Shorter TTI is a technique for reducing retransmission time delay and thus increasing system throughput by allowing the use of a shorter TTI than the shortest TTI of 10 ms provided by 3GPP Rel5. At present, 2 ms is under consideration as the length of such a shorter TTI.

Node B-controlled scheduling is a scheme in which the Node B determines whether to permit E-DCH transmission for the UE and if it does, an allowed maximum data rate and transmits the determined data rate information as a scheduling grant to the UE, and the UE determines an available E-DCH data rate based on the scheduling grant.

The Node B-controlled scheduling is performed such that the noise rise or Rise over Thermal (RoT) measurement of the Node B does not exceed a target RoT to increase total system performance by, for example, allocating low data rates to remote UEs and high data rates to nearby UEs. RoT represents uplink radio resources used by the Node B, defined as $$RoT = I_o/N_o \qquad (1)$$

where $I_o$ denotes power spectral density over a total reception band, that is, the total amount of uplink signals received in the Node B, and No denotes the thermal noise power spectral density of the Node B. Therefore, an allowed maximum RoT is total uplink radio resources available to the Node B.

The total RoT is expressed as the sum of inter-cell interference, voice traffic and E-DCH traffic. With Node B-controlled scheduling, simultaneous transmission of packets from a plurality of UEs at high data rates is prevented, maintaining the total RoT at or below a target RoT and thus ensuring reception performance.

FIG. 1 is a diagram illustrating a typical signal flow for data transmission and reception on the E-DCH. In the illustrated case of FIG. 1, a UE transmits uplink data on the E-DCH and a Node B performs Node B-controlled scheduling for the UE.

Referring to FIG. 1, the Node B and UE establish the E-DCH in step 102. Step 102 involves message transmission on dedicated transport channels. The UE transmits scheduling information to the Node B in step 104. The scheduling information may contain uplink channel status information including the transmit power and power margin of the UE, and the amount of buffered data to be transmitted to the Node B.

In step 106, the Node B monitors scheduling information from a plurality of UEs to schedule uplink data transmissions for the individual UEs. When the Node B decides to approve an uplink packet transmission from the UE, it transmits a scheduling grant including scheduling assignment information to the UE in step 108. The scheduling grant indicates up/hold/down in an allowed maximum data rate, or an allowed maximum data rate and allowed transmission timing. In step 110, the UE determines the TF of the E-DCH (E-TF) based on the scheduling grant. The UE then transmits E-TF information to the Node B in step 112, and uplink packet data on the E-DCH as well in step 114.

The Node B determines whether the E-TF information and the uplink packet data have errors in step 116. In the presence of errors in either of the TF information and the uplink packet data, the Node B transmits a negative acknowledgement (NACK) signal to the UE on an acknowledgement/negative acknowledgement (ACK/NACK) channel, whereas in the absence of errors in both, the Node B transmits an acknowledgement (ACK) signal to the UE on the ACK/NACK channel in step 118. In the latter case, the packet data transmission is completed and the UE transmits new packet data to the Node B on the E-DCH. On the other hand, in the former case, the UE retransmits the same packet data to the Node B on the E-DCH.

For efficient scheduling under the above-described environment, the Node B receives scheduling information about buffer occupancy and power status from UEs. Based on the scheduling information, the Node B allocates low data rates to remote UEs, UEs in a bad channel status, and UEs having data with a low service class and high data rates to nearby UEs, UEs in a good channel status, and UEs having data with a high service class. In this context, a need exists for developing a technique for transmitting and receiving a scheduling grant, which can be an Absolute Grant (AG) indicating the absolute value of an allowed maximum data rate for a UE or a Relative Grant (RG) indicating up/hold/down from the previous allowed maximum data rate.

SUMMARY OF THE INVENTION

An aspect of the present invention is to address at least the above problems and/or disadvantages and to provide at least the advantages described below. Accordingly, an aspect of the present invention is to provide a method and apparatus for improving the transmission reliability of control information of a small block size such as an E-DCH scheduling grant.

The present invention also provides a method and apparatus for transmitting information with a higher reliability requirement, such as an Absolute Grant (AG) indicating an allowed maximum data rate for a UE.

The above exemplary objects are achieved by providing a method and apparatus for transmitting control information of a small block size with high reliability in a mobile communication system supporting uplink packet data service.

According to one aspect of an exemplary embodiment of the present invention, in a method of transmitting control information associated with uplink packet data transmission in a mobile communication system, a 16-bit UE-ID specific CRC is generated by combining a CRC generated for detecting errors from the control information with a User Equipment Identifier (UE-ID) for identifying a UE to receive the control information. 90 coded bits are generated by adding the UE-ID specific CRC and 8 tails bits to 6-bit control information and encoding the added bits at a coding rate of 1/3. A 60-bit rate-matched block is generated by rate-matching the coded bits according to a predetermined rate matching pattern representing the positions of bits to be punctured among the coded bits. The rate-matched block is transmitted to the UE. The rate matching pattern is {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

According to another aspect of the an exemplary embodiment of the present invention, in an apparatus of transmitting control information associated with uplink packet data transmission in a mobile communication system, a UE-ID specific CRC generator generates a 16-bit UE-ID specific CRC by combining a CRC generated for detecting errors from the control information with a UE-ID for identifying a UE to receive the control information. A channel encoder generates 90 coded bits by adding the UE-ID specific CRC and 8 tails bits to 6-bit control information and encoding the added bits at a coding rate of 1/3. A rate matcher generates a 60-bit rate-matched block by rate-matching the coded bits according to a predetermined rate matching pattern representing the positions of bits to be punctured among the coded bits. A physical channel mapper transmits the rate-matched block to the UE. The rate matching pattern is {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

According to a further aspect of the an exemplary embodiment of the present invention, in a method of receiving control information associated with uplink packet data transmission in a mobile communication system, a 60-bit rate-matched block is extracted from a signal received from a Node B. 90 coded bits are generated by rate-dematching the rate-matched block according to a predetermined rate matching pattern representing the positions of bits to be depunctured. 6-bit control information and a 16-bit UE-ID specific CRC are obtained by decoding the coded bits at a coding rate of 1/3. The control information is output by checking the UE-ID specific CRC. The rate matching pattern is {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

According to still another aspect of the an exemplary embodiment of the present invention, in an apparatus for receiving control information associated with uplink packet data transmission in a mobile communication system, a physical channel demapper extracts a 60-bit rate-matched block from a signal received from a Node B. A rate dematcher generates 90 coded bits by rate-dematching the rate-matched block according to a predetermined rate matching pattern representing the positions of bits to be depunctured. A channel decoder generates 6-bit control information and a 16-bit UE-ID specific CRC by decoding the coded bits at a coding rate of 1/3. A CRC checker outputs the control information by checking the UE-ID specific CRC. The rate matching pattern is {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

BRIEF DESCRIPTION OF THE DRAWINGS

The above and other exemplary objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Certain exemplary embodiments of the present invention will be described below in the context of the E-DCH of UMTS. A physical channel called E-DCH Absolute Grant CHannel (E-AGCH) carries an AG from a Node B to a UE. The AG is determined by the Node B scheduler according to scheduling information received from the UE and uplink radio resources available to the Node B.

The AG can include an allowed maximum data rate indicating the maximum amount of uplink radio resources available to the UE or a power offset equivalent to the allowed maximum data rate, an AG validity duration indicator indicating how long the AG is valid, and an AG validity process indicator indicating whether the AG is valid for one particular HARQ process or an entire HARQ process. The power offset is defined as a maximum power ratio of an Enhanced Dedicated Physical Data CHannel (E-DPDCH) on which the E-DCH is mapped to a reference physical channel whose power is controlled, Dedicated Physical Control CHannel (DPCCH). A 4 to 8-bit allowed maximum data rate or power offset, a 1-bit AG validity duration indicator, and a 1-bit AG validity process indicator are under consideration. The E-AGCH further requires a UE-ID for identifying the UE on a common channel and a Cyclic Redundancy Check (CRC) code for detecting errors from the AG. The UE-ID and the CRC each have 16 bits and are modulo-2 operated on a bit basis. They are included together with the AG in control information delivered on the E-AGCH, in the form of a 16-bit CRC masked with a UE-ID.

Therefore, the control information of the E-AGCH can be a total of 21 to 26 bits in length. This control information, particularly the AG is intended for efficient radio resource allocation and thus requires high reliability in transmission. Typically, communication systems use channel coding for high-reliability data transmission/reception. The channel coding enables a receiver to correct transmission errors by attaching redundancy information to transmission data.

A convolutional code with a constraint length of 9 and a coding rate of 1/3, defined in the 3GPP standards, can be taken as a channel coding technique for high-reliability E-AGCH transmission and reception. 21 to 26-bit control information to be delivered on the E-AGCH is attached with 8 tail bits and then encoded to 87 to 102 coded bits ((21+8)×3=87, (26+8)×3=102) through rate 1/3 convolutional coding.

Figure 1:
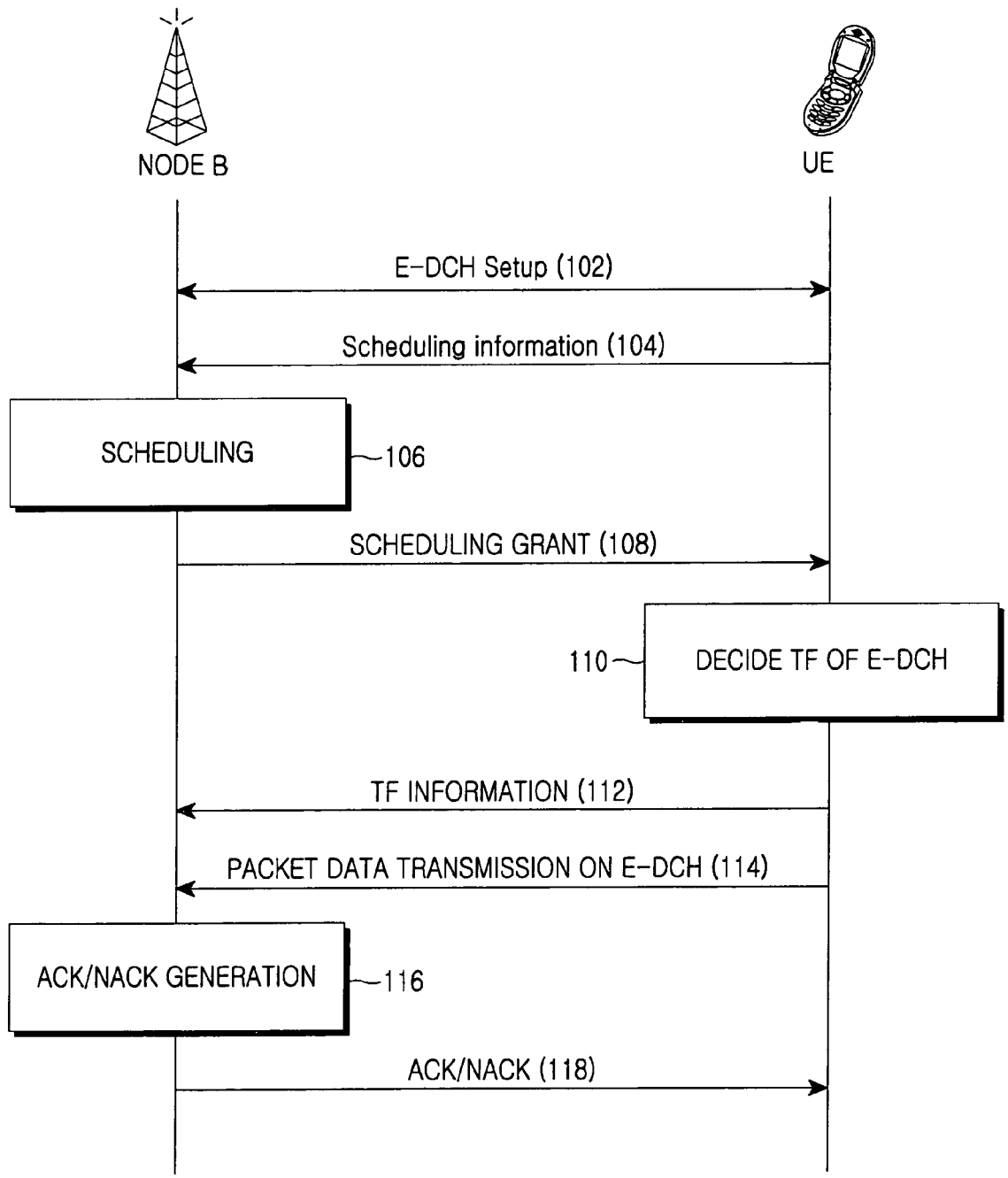
FIG. 1 is a diagram illustrating a typical signal flow for data transmission and reception on an E-DCH.
Figure 2A:
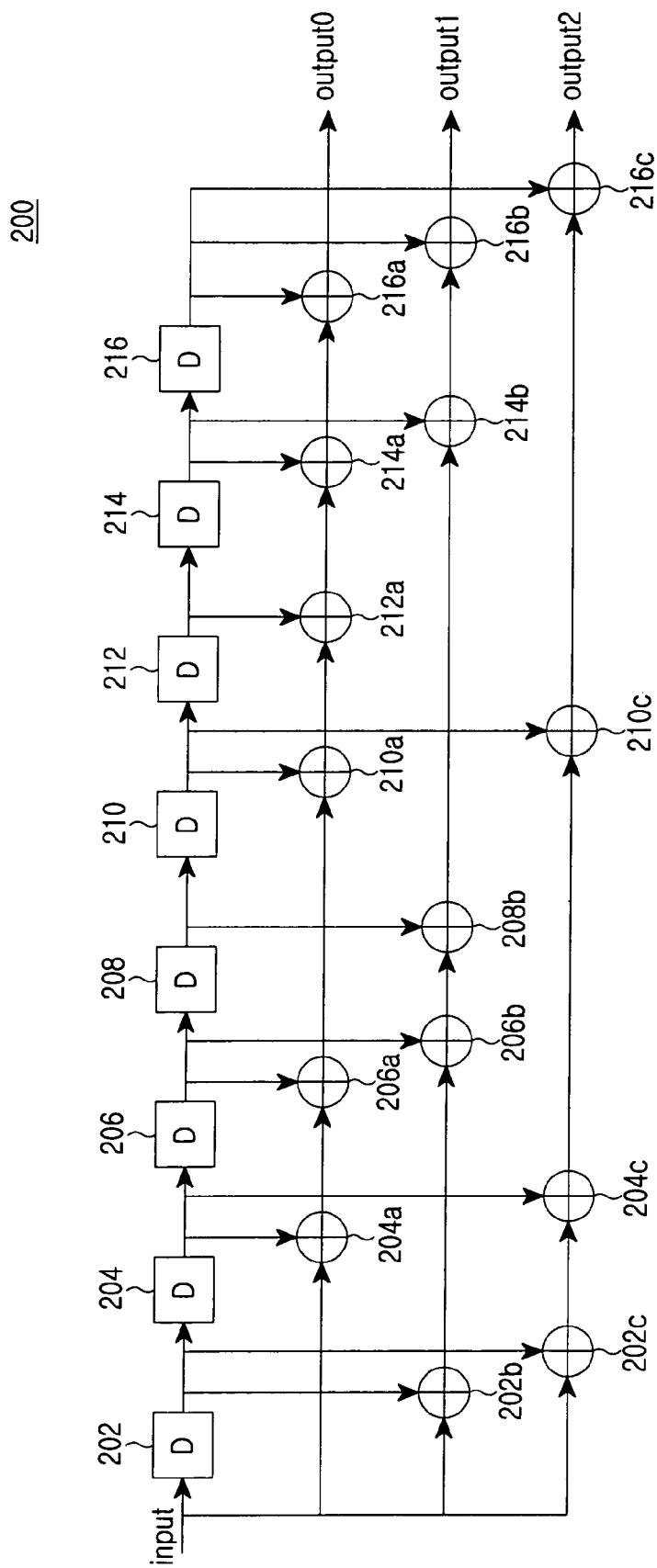
FIGS. 2A and 2B illustrate a rate 1/3 convolutional encoder and a rate 1/2 convolutional encoder, respectively.

FIG. 2A illustrates a convolutional encoder 200 with a constraint length of 9 and a coding rate of 1/3 defined in the 3GPP standards.

Referring to FIG. 2A, the convolutional encoder 200 includes eight serial shift registers 202, 204, 206, 208, 210, 212, 214 and 216 and a plurality of adders 202b, 202c, 204a, 204c, 206a, 206b, 208b, 210a, 210c, 212a, 214a, 214b, 216a, 216b and 216c for receiving input information bits or the output bits of the shift registers 202 to 216. Input information including eight tail bits sequentially pass through the shift registers 202 to 216, starting from the first bit, and coded bits are produced in an order of output0, output1, output2, output0, output1, output2, . . . .

The channel-coded control information is delivered in a 2-ms TTI of the E-AGCH. If a Spreading Factor (SF) of 256 and Quadrature Phase Shift Keying (QPSK) are applied to the E-AGCH, a total of 60 bits can be transmitted in the 2-ms TTI. Therefore, 27 bits (=87−60) to 42 bits (=102−60) are punctured from the coded control information of the E-AGCH. Rate matching can be used for the puncturing. The rate matching matches the number of the channel-coded bits to that of transmittable bits on a physical channel by puncturing or repeating bits at predetermined positions in the channel-coded bit stream of a block. Generally, the punctured or repeated bit positions are equidistant in the rate matching.

However, rate matching of small-size control information, such as, 20 bits delivered on the E-AGCH makes it difficult to achieve an optimum BLock Error Rate (BLER). If such a block with a relatively small number of bits is convolutionally encoded and rate-matched, the start and end of the block experience low Bit Error Rates (BERs), while its middle has a high BER. Consequently, the BLER of the block is increased and the reliability of the E-AGCH is decreased. The existence of at least one erroneous bit in one block leads to a BLER. If a particular part of one block has a low BER but the remaining part has a high BER, this results in performance degradation rather than performance improvement from the BLER's point of view.

High-reliability (i.e. less erroneous) transmission and reception of the E-AGCH control information is achieved by reducing its BLER. Yet, the conventional rate matching leads to a large BER deviation at each bit position of the block.

In this context, the exemplary embodiments of the present invention are intended to provide rate matching, which minimizes BLER and enables transmission of control information of a small block size. To serve this purpose, rate matching patterns are proposed, which minimize the change of BER at each bit position of one block of control information and thus reduce BLER for the E-AGCH that delivers small-size control information of about 20 bits after convolutional channel coding.

Rate matching patterns which may improve the BLER performance of control information delivered on the E-AGCH maybe realized in certain exemplary embodiments of the present invention. First through sixth exemplary embodiments pertain to examples of rate matching patterns and corresponding transmission and reception for a 7-bit AG, an 8-bit AG, a 9-bit AG, a 10-bit AG and a 5-bit AG, respectively.

Exemplary Embodiment 1

A rate matching pattern for a 6-bit AG is provided as an example of an implementation of the present invention. For instance, the AG includes a 4-bit allowed maximum data rate representing the maximum amount of uplink radio resources available to a UE or a 4-bit power offset equivalent to the allowed maximum data rate, a 1-bit AG validity duration indicator for indicating how long the AG is valid, and a 1-bit AG validity process indicator for indicating whether the AG is valid for one particular HARQ process or an entire HARQ process. Or the AG includes a 5-bit allowed maximum data rate or power offset and a 1-bit AG validity duration indicator.

In a third example, the AG includes a 5-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of six bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 22-bit control information with the 6-bit AG concatenated to the 16-bit UE-ID specific CRC and convolutionally encoded with a constraints length of 9 at a coding rate of 1/3. As a result, one channel-coded block being a 90-bit coded bit stream is produced. 30 bits are punctured from the 90-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching patterns are available.

Rate matching pattern=
{1, 2, 5, 6, 7, 11, 12, 14, 15, 17, 23, 24, 31, 37, 44, 47, 61, 63, 64, 71, 72, 75, 77, 80, 83, 84, 85, 87, 88, 90},
{1, 2, 3, 4, 5, 6, 7, 8, 12, 14, 15, 18, 24, 48, 51, 54, 57, 60, 63, 66, 75, 78, 80, 81, 83, 84, 86, 87, 89, 90},
{1, 2, 3, 4, 5, 6, 7, 8, 12, 14, 15, 18, 21, 24, 57, 60, 66, 69, 75, 78, 80, 81, 83, 84, 85, 86, 87, 88, 89, 90},
{1, 2, 3, 5, 6, 7, 8, 12, 14, 15, 18, 23, 25, 48, 50, 52, 57, 59, 61, 71, 75, 77, 79, 80, 82, 84, 86, 87, 88, 89},
{1, 2, 3, 4, 5, 6, 7, 8, 12, 14, 15, 24, 42, 48, 54, 57, 60, 66, 75, 78, 80, 81, 83, 84, 85, 86, 87, 88, 89, 90},
{1, 2, 3, 4, 5, 6, 7, 8, 12, 14, 15, 18, 24, 48, 50, 52, 57, 59, 61, 66, 75, 78, 80, 81, 83, 84, 86, 87, 89, 90},
{1, 2, 3, 4, 5, 6, 7, 8, 12, 14, 15, 24, 42, 54, 57, 60, 66, 69, 75, 78, 80, 81, 83, 84, 85, 86, 87, 88, 89, 90}, or
{1, 2, 3, 5, 6, 7, 8, 10, 12, 14, 15, 18, 23, 25, 50, 52, 57, 59, 61, 71, 75, 77, 79, 80, 82, 84, 86, 87, 88, 89}.

The elements of each of the rate matching patterns represent the positions of bits to be punctured among the channel-coded bits #1 to #90. Given a 10-ms E-AGCH TTI, the 2-ms E-AGCH TTI occurs five times.

Figure 3:
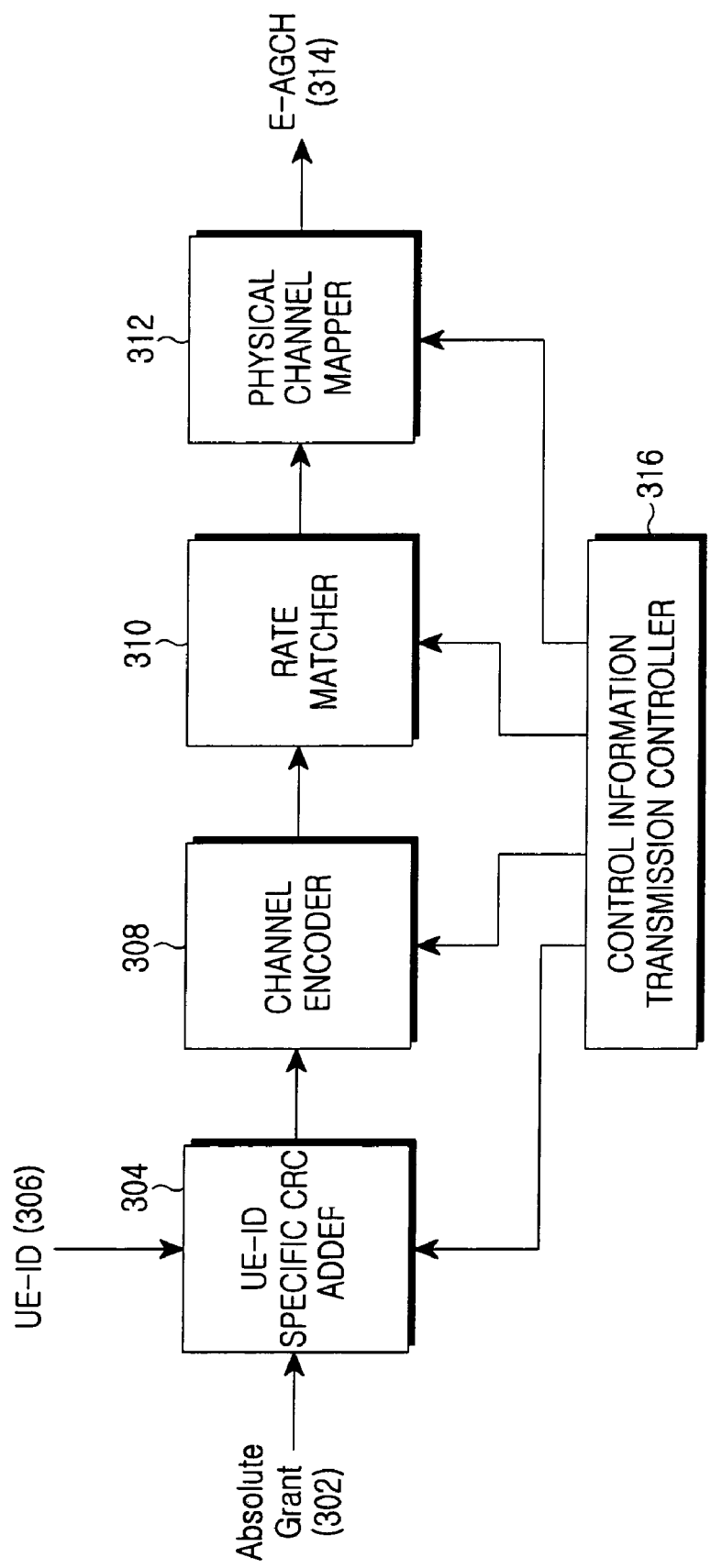
FIG. 3 is a block diagram of a Node B transmitter according to a preferred embodiment of the present invention.

FIG. 3 is a block diagram of a Node B transmitter for transmitting the E-AGCH according to an exemplary embodiment of the present invention.

Referring to FIG. 3, upon input of a 6-bit AG 302, a UE-ID specific CRC adder 304 creates a 16-bit CRC from the AG, generates a UE-ID specific CRC by modulo-2 operating the 16-bit CRC with a 16-bit UE-ID for identifying the UE to receive the AG, and then combines the UE-ID specific CRC with the AG, thereby producing 22-bit control information. A channel encoder 308, which uses a convolutional code with a constraint length of 9 and a coding rate 1/3, adds eight tail bits to the 22-bit control information and convolutionally encodes the 30-bit information to a 90-bit coded block.

A rate matcher 310 punctures the 90-bit coded block in a predetermined rate matching pattern. A physical channel mapper 312 maps the rate-matched block to a physical channel frame configured to be suitable for 2-ms E-AGCH TTIs. Thus, the control information is transmitted on an E-AGCH 314. Meanwhile, a control information transmission controller 316 controls transmission of the control information for an E-DCH through the UE-ID specific CRC adder 304, the channel encoder 308, the rate matcher 310, and the physical channel mapper 312. In an exemplary implementation, the control information transmission controller 316 manages the coding rate of the channel encoder 308 and the rate matching pattern of the rate matcher 310. The control information transmission controller 316 stores at least one of the above rate matching patterns and applies one of the rate matching patterns to the rate matcher 310. The rate matching pattern used is preset between the transmitter and a receiver. The control information transmission controller 316 can be incorporated into a packet data reception controller (not shown) for controlling reception of packet data on the E-DCH.

Figure 4:
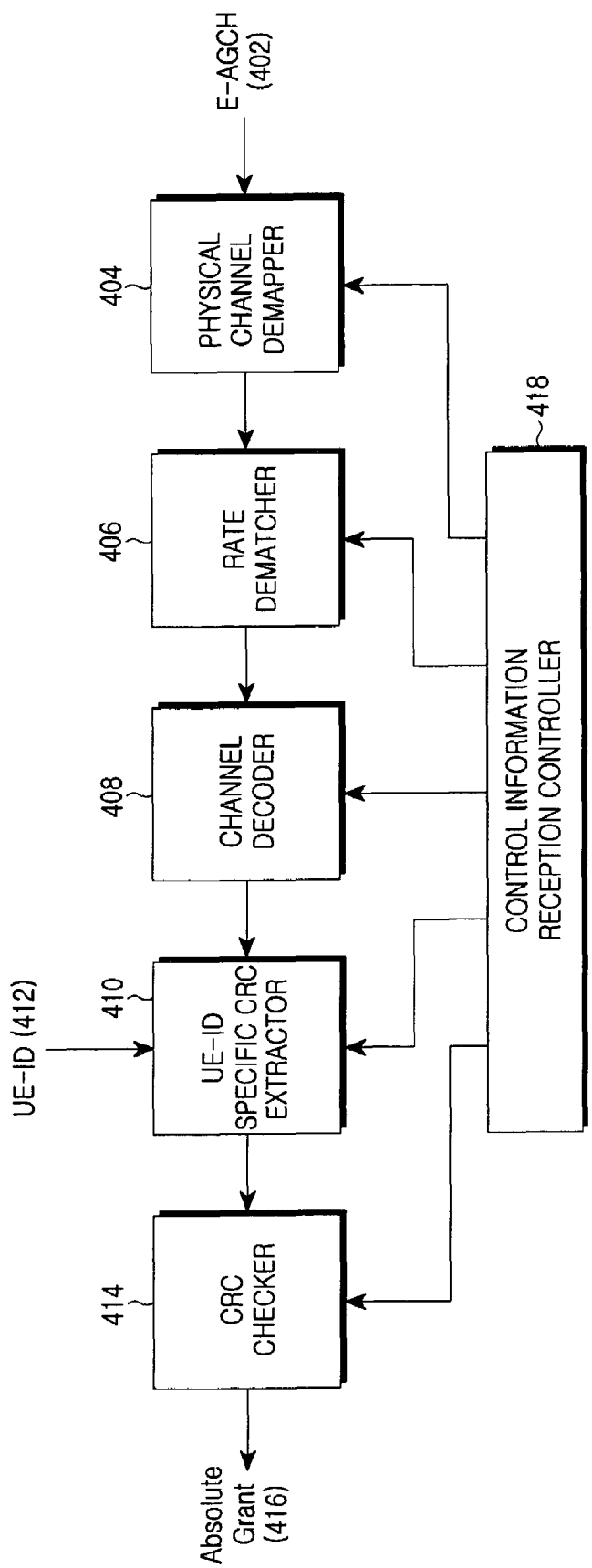
FIG. 4 is a block diagram of a UE receiver according to a preferred embodiment of the present invention.

FIG. 4 is a block diagram of a UE receiver for receiving the E-AGCH according to an exemplary embodiment of the present invention.

Referring to FIG. 4, the UE receives a signal on an E-AGCH 402. A physical channel demapper 404 extracts a rate-matched block from a 2-ms TTI in the received signal. A rate dematcher 406 recovers (that is, depunctures) the bits punctured by the rate matcher 310 for the rate-matched block by filling 0 s at the punctured bit positions according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

A channel decoder 408 decodes the coded block received from the rate dematcher 406. The coded block is divided into a 6-bit AG and a 16-bit UE-ID specific CRC. A UE-ID specific CRC extractor 410 extracts a 16-bit CRC by modulo-2 operating the 16-bit UE-ID specific CRC with the 16-bit UE-ID 412 of the UE, and provides the extracted CRC and the AG to a CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, a control information reception controller 418 controls the reception of the control information for the E-DCH through the physical channel demapper 404, the rate dematcher 406, the channel decoder 408, the UE-ID specific CRC extractor 410, and the CRC checker 414. In an exemplary implementation, the control information reception controller 418 manages the rate matching pattern of the rate dematcher 406 and the coding rate of the channel decoder 408. The control information reception controller 418 stores at least one of the above rate matching patterns and applies one of the rate matching patterns to the rate dematcher 406. The control information reception controller 418 can be incorporated into a packet data transmission controller (not shown) for controlling transmission of packet data on the E-DCH.

Exemplary Embodiment 2

A rate matching pattern for a 7-bit AG is provided as an example of an implementation of the present invention. For instance, the AG includes a 5-bit allowed maximum data rate representing the maximum amount of uplink radio resources available to a UE or a 5-bit power offset equivalent to the allowed maximum data rate, a 1-bit AG validity duration indicator indicating how long the AG is valid, and a 1-bit AG validity process indicator indicating whether the AG is valid for one particular HARQ process or an entire HARQ process. Or the AG includes a 6-bit allowed maximum data rate or power offset and a 1-bit AG validity duration indicator.

In a third example, the AG includes a 6-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of seven bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 23-bit control information with the 7-bit AG concatenated to the 16-bit UE-ID specific CRC and convolutionally encoded with a constraints length of 9 at a coding rate of 1/3. As a result, one channel-coded block being a 93-bit coded bit stream is produced. 33 bits are punctured from the 93-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching patterns are available.

Rate matching pattern=

{1, 3, 4, 5, 7, 9, 11, 12, 13, 15, 17, 20, 23, 42, 45, 46, 50, 54, 70, 71, 74, 77, 80, 81, 82, 83, 85, 86, 87, 89, 90, 91, 93},

{1, 2, 3, 4, 5, 6, 7, 8, 10, 12, 14, 15, 21, 24, 42, 47, 54, 56, 58, 66, 68, 78, 81, 83, 84, 86, 87, 88, 89, 90, 91, 92, 93},

{1, 2, 3, 5, 6, 7, 8, 10, 12, 14, 15, 16, 21, 23, 42, 47, 49, 54, 56, 58, 66, 68, 73, 78, 80, 82, 83, 85, 87, 89, 90, 91, 92},

{1, 2, 3, 4, 5, 6, 7, 8, 10, 12, 14, 15, 21, 23, 25, 42, 47, 54, 56, 58, 66, 68, 73, 78, 80, 82, 83, 85, 87, 89, 90, 91, 92},

{1, 2, 3, 5, 6, 7, 8, 12, 14, 15, 16, 21, 23, 25, 42, 47, 49, 54, 56, 58, 66, 68, 75, 77, 79, 82, 83, 85, 87, 89, 90, 91, 92},

{1, 2, 3, 4, 5, 6, 7, 8, 10, 12, 14, 15, 21, 24, 42, 48, 54, 57, 60, 66, 69, 78, 81, 83, 84, 86, 87, 88, 89, 90, 91, 92, 93},

{1, 2, 3, 4, 5, 6, 7, 8, 12, 14, 15, 16, 21, 23, 28, 42, 49, 54, 56, 58, 66, 68, 74, 78, 80, 82, 83, 85, 87, 89, 90, 91, 92},

{1, 2, 3, 4, 5, 6, 7, 8, 10, 12, 14, 15, 18, 21, 24, 27, 54, 57, 60, 66, 69, 78, 81, 83, 84, 86, 87, 88, 89, 90, 91, 92, 93},

{1, 2, 3, 4, 5, 6, 7, 8, 12, 14, 15, 21, 24, 42, 48, 54, 57, 60, 63, 66, 69, 78, 81, 83, 84, 86, 87, 88, 89, 90, 91, 92, 93}, or

{1, 2, 3, 4, 5, 6, 7, 8, 12, 14, 15, 21, 24, 42, 48, 54, 57, 60, 63, 66, 69, 72, 75, 78, 81, 83, 84, 86, 87, 89, 90, 92, 93}

The elements of each of the rate matching patterns represent the positions of bits to be punctured among the channel-coded bits #1 to #93. Given a 10-ms E-AGCH TTI, the 2-ms E-AGCH TTI occurs five times.

With reference to FIG. 3, a Node B transmitter for transmitting the E-AGCH according to the second exemplary embodiment of the present invention will be described.

Referring to FIG. 3, upon input of a 7-bit AG 302, the UE-ID specific CRC adder 304 creates a 16-bit CRC from the AG, generates a UE-ID specific CRC by modulo-2 operating the 16-bit CRC with a 16-bit UE-ID for identifying the UE to receive the AG, and then combines the UE-ID specific CRC with the AG, thereby producing 23-bit control information. The channel encoder 308, which uses a convolutional code with a constraint length of 9 and a coding rate 1/3, adds eight tail bits to the 23-bit control information and convolutionally encodes the 31-bit information to a 93-bit coded block.

The rate matcher 310 punctures the 93-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314. Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores at least one of the above rate matching patterns and applies a preset one of the rate matching patterns to the rate matcher 310.

With reference to FIG. 4, a UE receiver for receiving the E-AGCH according to the second exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into a 7-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

Exemplary Embodiment 3

A rate matching pattern for an 8-bit AG is provided as an example of an implementation of the present invention. For instance, the AG includes a 6-bit allowed maximum data rate representing the maximum amount of uplink radio resources available to a UE or a 6-bit power offset equivalent to the allowed maximum data rate, a 1-bit AG validity duration indicator indicating how long the AG is valid, and a 1-bit AG validity process indicator indicating whether the AG is valid for one particular HARQ process or an entire HARQ process. Or the AG includes a 7-bit allowed maximum data rate or power offset and a 1-bit AG validity duration indicator.

In a third example, the AG includes a 7-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of eight bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 24-bit control information with the 8-bit AG concatenated to the 16-bit UE-ID specific CRC and convolutionally encoded with a constraints length of 9 at a coding rate of 1/3. As a result, one channel-coded block being a 96-bit coded bit stream is produced. 36 bits are punctured from the 96-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching patterns are available.

Rate matching pattern=

{1, 3, 4, 6, 7, 8, 11, 13, 14, 20, 22, 23, 24, 25, 32, 36, 40, 44, 47, 50, 58, 64, 70, 73, 76, 77, 79, 80, 83, 86, 88, 89, 92, 93, 94, 96},

{1, 2, 3, 4, 5, 6, 7, 8, 12, 14, 15, 19, 24, 29, 35, 37, 45, 47, 50, 54, 58, 62, 68, 75, 82, 85, 86, 87, 89, 90, 91, 92, 93, 94, 95, 96},
{1, 2, 3, 5, 6, 7, 9, 11, 13, 15, 21, 23, 25, 32, 41, 43, 48, 50, 52, 57, 59, 64, 69, 75, 77, 79, 82, 83, 86, 87, 88, 90, 92, 93, 94, 95},
{1, 2, 3, 5, 6, 7, 9, 11, 13, 15, 21, 23, 25, 30, 32, 41, 43, 48, 50, 52, 57, 59, 64, 69, 77, 79, 82, 83, 86, 87, 88, 90, 92, 93, 94, 95},
{1, 2, 3, 5, 6, 7, 9, 11, 13, 15, 21, 23, 25, 32, 48, 50, 52, 57, 59, 61, 66, 68, 70, 75, 77, 79, 82, 83, 86, 87, 88, 90, 92, 93, 94, 95},
{1, 2, 3, 5, 6, 7, 9, 11, 13, 15, 21, 23, 25, 30, 32, 34, 41, 43, 48, 50, 52, 57, 59, 64, 69, 79, 82, 83, 86, 87, 88, 90, 92, 93, 94, 95},
{1, 2, 3, 4, 5, 6, 7, 8, 12, 14, 15, 24, 27, 30, 33, 42, 45, 48, 51, 54, 57, 60, 66, 69, 81, 84, 86, 87, 89, 90, 91, 92, 93, 94, 95, 96},
{2, 3, 4, 5, 7, 9, 11, 13, 15, 21, 23, 25, 30, 32, 34, 39, 41, 43, 48, 50, 52, 57, 59, 64, 69, 80, 82, 84, 86, 87, 88, 90, 92, 93, 94, 95},
{1, 2, 3, 4, 5, 6, 7, 8, 10, 12, 14, 15, 17, 18, 20, 21, 24, 27, 57, 60, 63, 66, 69, 72, 81, 84, 86, 87, 89, 90, 91, 92, 93, 94, 95, 96},
{1, 2, 3, 4, 5, 6, 7, 8, 12, 14, 15, 24, 26, 28, 33, 42, 44, 46, 51, 53, 55, 60, 66, 69, 81, 84, 86, 87, 89, 90, 91, 92, 93, 94, 95, 96}, or
{1, 2, 3, 4, 5, 6, 7, 8, 10, 12, 14, 15, 24, 27, 30, 33, 42, 45, 48, 51, 54, 57, 60, 66, 81, 84, 86, 87, 89, 90, 91, 92, 93, 94, 95, 96}

The elements of each of the rate matching patterns represent the positions of bits to be punctured among the channel-coded bits #1 to #96. Given a 10-ms E-AGCH TTI, the 2-ms E-AGCH TTI occurs five times.

With reference to FIG. 3, a Node B transmitter for transmitting the E-AGCH according to the third exemplary embodiment of the present invention will be described.

Referring to FIG. 3, upon input of an 8-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 24-bit control information. The channel encoder 308, which uses a convolutional code with a constraint length of 9 and a coding rate 1/3, adds eight tail bits to the 24-bit control information and convolutionally encodes the 32-bit information to a 96-bit coded block.

The rate matcher 310 punctures the 96-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314.

Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores at least one of the above rate matching patterns and applies a preset one of the rate matching patterns to the rate matcher 310.

With reference to FIG. 4, a UE receiver for receiving the E-AGCH according to the third exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into an 8-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

Exemplary Embodiment 4

A rate matching pattern for a 9-bit AG is provided as an example of an implementation of the present invention. For instance, the AG includes a 7-bit allowed maximum data rate representing the maximum amount of uplink radio resources available to a UE or a 7-bit power offset equivalent to the allowed maximum data rate, a 1-bit AG validity duration indicator indicating how long the AG is valid, and a 1-bit AG validity process indicator indicating whether the AG is valid for one particular HARQ process or an entire HARQ process. Or the AG includes an 8-bit allowed maximum data rate or power offset and a 1-bit AG validity duration indicator.

In a third example, the AG includes an 8-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of nine bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 25-bit control information with the 9-bit AG concatenated to the 16-bit UE-ID specific CRC and convolutionally encoded with a constraints length of 9 at a coding rate of 1/3. As a result, one channel-coded block being a 99-bit coded bit stream is produced. 39 bits are punctured from the 99-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching patterns are available.

Rate matching pattern=
{2, 3, 4, 5, 6, 9, 10, 12, 14, 17, 18, 21, 27, 32, 33, 36, 37, 41, 49, 51, 52, 55, 62, 71, 72, 73, 78, 80, 85, 86, 88, 89, 91, 93, 94, 95, 96, 97, 98},
{2, 3, 4, 5, 7, 9, 11, 13, 15, 17, 19, 21, 23, 25, 30, 31, 35, 42, 44, 46, 51, 53, 55, 60, 62, 64, 69, 71, 83, 85, 86, 89, 90, 91, 93, 95, 96, 97, 98},
{2, 3, 4, 5, 6, 7, 8, 12, 13, 15, 17, 19, 21, 24, 26, 31, 35, 42, 44, 46, 51, 53, 55, 60, 62, 64, 69, 71, 82, 85, 86, 89, 90, 91, 93, 95, 96, 97, 98},
{1, 2, 3, 4, 6, 7, 8, 12, 13, 15, 17, 19, 21, 24, 26, 31, 35, 42, 44, 46, 51, 53, 55, 60, 62, 64, 69, 71, 82, 85, 86, 89, 90, 91, 93, 95, 96, 97, 98},
{1, 2, 3, 4, 5, 6, 7, 8, 10, 12, 14, 15, 17, 18, 19, 21, 24, 42, 47, 54, 56, 58, 66, 68, 71, 72, 73, 75, 84, 86, 87, 89, 90, 92, 93, 95, 96, 98, 99},
{1, 2, 3, 4, 5, 6, 7, 8, 10, 12, 14, 15, 17, 18, 20, 21, 24, 42, 48, 54, 57, 60, 66, 69, 71, 72, 74, 75, 84, 86, 87, 89, 90, 92, 93, 95, 96, 98, 99},
{1, 2, 3, 5, 6, 7, 8, 12, 13, 15, 17, 18, 19, 21, 24, 26, 34, 42, 44, 46, 51, 53, 55, 60, 62, 64, 69, 71, 83, 85, 86, 89, 90, 91, 93, 95, 96, 97, 98},
{1, 2, 3, 4, 5, 6, 7, 8, 12, 14, 15, 18, 21, 24, 30, 33, 39, 42, 48, 54, 57, 60, 63, 66, 69, 72, 75, 84, 87, 89, 90, 92, 93, 94, 95, 96, 97, 98, 99},
{1, 2, 3, 4, 5, 6, 7, 8, 10, 12, 14, 15, 17, 18, 21, 24, 27, 54, 57, 60, 63, 66, 69, 72, 75, 78, 81, 84, 86, 87, 89, 90, 92, 93, 95, 96, 97, 98, 99}, or
{1, 2, 3, 4, 5, 6, 7, 8, 10, 12, 14, 15, 17, 18, 20, 21, 24, 27, 30, 60, 66, 69, 72, 75, 78, 80, 81, 83, 84, 86, 87, 89, 90, 92, 93, 95, 96, 98, 99}

The elements of each of the rate matching patterns represent the positions of bits to be punctured among the channel-coded bits #1 to #99. Given a 10-ms E-AGCH TTI, the 2-ms E-AGCH TTI occurs five times.

With reference to FIG. 3, a Node B transmitter for transmitting the E-AGCH according to the fourth exemplary embodiment of the present invention will be described.

Referring to FIG. 3, upon input of a 9-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 25-bit control information. The channel encoder 308, which uses a convolutional code with a constraint length of 9 and a coding rate 1/3, adds eight tail bits to the 25-bit control information and convolutionally encodes the 33-bit information to a 99-bit coded block.

The rate matcher 310 punctures the 99-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314.

Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores at least one of the above rate matching patterns and applies a preset one of the rate matching patterns to the rate matcher 310.

With reference to FIG. 4, a UE receiver for receiving the E-AGCH according to the fourth exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into a 9-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

Exemplary Embodiment 5

A rate matching pattern for a 10-bit AG is provided as an example of an implementation of the present invention. For instance, the AG includes an 8-bit allowed maximum data rate representing the maximum amount of uplink radio resources available to a UE or an 8-bit power offset equivalent to the allowed maximum data rate, a 1-bit AG validity duration indicator indicating how long the AG is valid, and a 1-bit AG validity process indicator indicating whether the AG is valid for one particular HARQ process or an entire HARQ process. Or the AG includes a 9-bit allowed maximum data rate or power offset and a 1-bit AG validity duration indicator.

In a third example, the AG includes a 9-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of ten bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 26-bit control information with the 10-bit AG concatenated to the 16-bit UE-ID specific CRC and convolutionally encoded with a constraints length of 9 at a coding rate of 1/3. As a result, one channel-coded block being a 102-bit coded bit stream is produced. 42-bits are punctured from the 102-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching patterns are available.

Rate matching pattern=
{1, 2, 3, 4, 5, 6, 10, 13, 14, 16, 19, 26, 28, 30, 31, 36, 38, 39, 41, 42, 45, 50, 52, 57, 68, 69, 71, 77, 79, 81, 82, 83, 85, 86, 88, 91, 95, 96, 97, 98, 100, 101},
{1, 3, 5, 6, 7, 9, 10, 12, 13, 15, 16, 17, 20, 21, 30, 32, 34, 42, 43, 44, 50, 52, 54, 55, 57, 61, 75, 78, 79, 82, 84, 87, 88, 90, 92, 93, 94, 97, 98, 99, 101, 102},
{1, 2, 3, 5, 6, 7, 8, 12, 13, 15, 17, 18, 19, 21, 23, 25, 33, 35, 37, 42, 44, 52, 57, 59, 61, 66, 68, 70, 75, 77, 84, 86, 88, 89, 92, 93, 94, 96, 98, 99, 100, 101},
{1, 2, 3, 4, 5, 6, 7, 8, 12, 14, 15, 17, 18, 19, 21, 23, 25, 33, 36, 38, 40, 54, 56, 58, 63, 65, 67, 72, 74, 76, 84, 86, 88, 89, 92, 93, 94, 96, 98, 99, 100, 101},
{1, 2, 3, 4, 5, 6, 7, 8, 10, 12, 14, 15, 17, 18, 20, 21, 24, 27, 36, 39, 42, 54, 57, 60, 63, 66, 69, 72, 75, 78, 84, 87, 89, 90, 92, 93, 95, 96, 98, 99, 101, 102},
{1, 2, 3, 4, 5, 6, 7, 8, 10, 12, 14, 15, 17, 18, 19, 21, 23, 25, 36, 38, 40, 54, 56, 58, 63, 65, 67, 72, 74, 76, 84, 87, 89, 90, 92, 93, 95, 96, 98, 99, 101, 102},
{1, 2, 3, 4, 5, 6, 7, 8, 12, 14, 15, 17, 18, 19, 21, 23, 25, 33, 36, 38, 40, 45, 47, 54, 56, 58, 63, 65, 67, 72, 84, 86, 88, 89, 92, 93, 94, 96, 98, 99, 100, 101},
{1, 2, 3, 4, 5, 6, 7, 8, 10, 12, 14, 15, 18, 21, 24, 33, 36, 39, 42, 48, 54, 57, 60, 66, 69, 72, 75, 78, 84, 87, 89, 90, 92, 93, 95, 96, 97, 98, 99, 100, 101, 102},
{1, 2, 3, 4, 5, 6, 7, 8, 10, 12, 14, 15, 17, 18, 21, 24, 27, 36, 39, 42, 54, 57, 60, 66, 69, 72, 75, 78, 84, 87, 89, 90, 92, 93, 95, 96, 97, 98, 99, 100, 101, 102}, or
{1, 2, 3, 4, 5, 6, 7, 8, 10, 12, 14, 15, 18, 21, 24, 33, 36, 39, 42, 48, 54, 57, 60, 66, 69, 72, 75, 87, 89, 90, 91, 92, 93, 94, 95, 96, 97, 98, 99, 100, 101, 102}

The elements of each of the rate matching patterns represent the positions of bits to be punctured among the channel-coded bits #1 to #102. Given a 10-ms E-AGCH TTI, the 2-ms E-AGCH TTI occurs five times.

With reference to FIG. 3, a Node B transmitter for transmitting the E-AGCH according to the fifth exemplary embodiment of the present invention will be described.

Referring to FIG. 3, upon input of a 10-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 26-bit control information. The channel encoder 308, which uses a convolutional code with a constraint length of 9 and a coding rate 1/3, adds eight tail bits to the 26-bit control information and convolutionally encodes the 34-bit information to a 102-bit coded block.

The rate matcher 310 punctures the 102-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314. Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores at least one of the above rate matching patterns and applies a preset one of the rate matching patterns to the rate matcher 310.

With reference to FIG. 4, a UE receiver for receiving the E-AGCH according to the fifth exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into a 10-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

Exemplary Embodiment 6

A rate matching pattern for a 5-bit AG is provided as an example of an implementation of the present invention. For instance, the AG includes a 4-bit allowed maximum data rate representing the maximum amount of uplink radio resources available to a UE or a 4-bit power offset equivalent to the allowed maximum data rate and a 1-bit AG validity duration indicator indicating how long the AG is valid. Or the AG includes a 4-bit allowed maximum data rate or power offset and a 1-bit AG validity duration indicator indicating whether the AG is valid for one particular HARQ process or an entire HARQ process.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 21-bit control information with the 5-bit AG concatenated to the 16-bit UE-ID specific CRC and convolutionally encoded with a constraints length of 9 at a coding rate of 1/3. As a result, one channel-coded block being an 87-bit coded bit stream is produced. 27 bits are punctured from the 87-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. When 2-ms TTIs are used for the E-AGCH, the following rate matching pattern is available.

Rate matching pattern={1, 2, 3, 6, 7, 10, 12, 14, 17, 19, 20, 21, 39, 45, 48, 59, 65, 67, 74, 75, 76, 80, 81, 83, 85, 86, 87}

The elements of the rate matching pattern represent the positions of bits to be punctured among the channel-coded bits #1 to #87. Given a 10-ms E-AGCH TTI, the 2-ms E-AGCH TTI occurs five times.

With reference to FIG. 3, a Node B transmitter for transmitting the E-AGCH according to the sixth exemplary embodiment of the present invention will be described.

Referring to FIG. 3, upon input of a 5-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 21-bit control information. The channel encoder 308, which uses a convolutional code with a constraint length of 9 and a coding rate 1/3, adds eight tail bits to the 21-bit control information and convolutionally encodes the 29-bit information to an 87-bit coded block.

The rate matcher 310 punctures the 87-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314. Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores the above rate matching pattern and applies it to the rate matcher 310.

With reference to FIG. 4, a UE receiver for receiving the E-AGCH according to the sixth exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into a 5-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

The first to sixth exemplary embodiments of the present invention described above use a convolutional code with a constraint length of 9 and a coding rate of 1/3 defined in the 3GPP standards as a channel encoding method for the E-AGCH. Below, seventh to eleventh exemplary embodiments of the present invention provide rate matching of the E-AGCH where a convolutional code with a constraint length of 9 and a coding rate of 1/2 defined in the 3GPP standards is used as a channel encoding method for the E-AGCH.

21 to 26-bit control information to be delivered on the E-AGCH is attached with 8 tail bits and then encoded to 58 to 68 coded bits ((21+8)×2=58, (26+8)×2=68) through rate 1/3 convolutional coding.

Figure 2B:
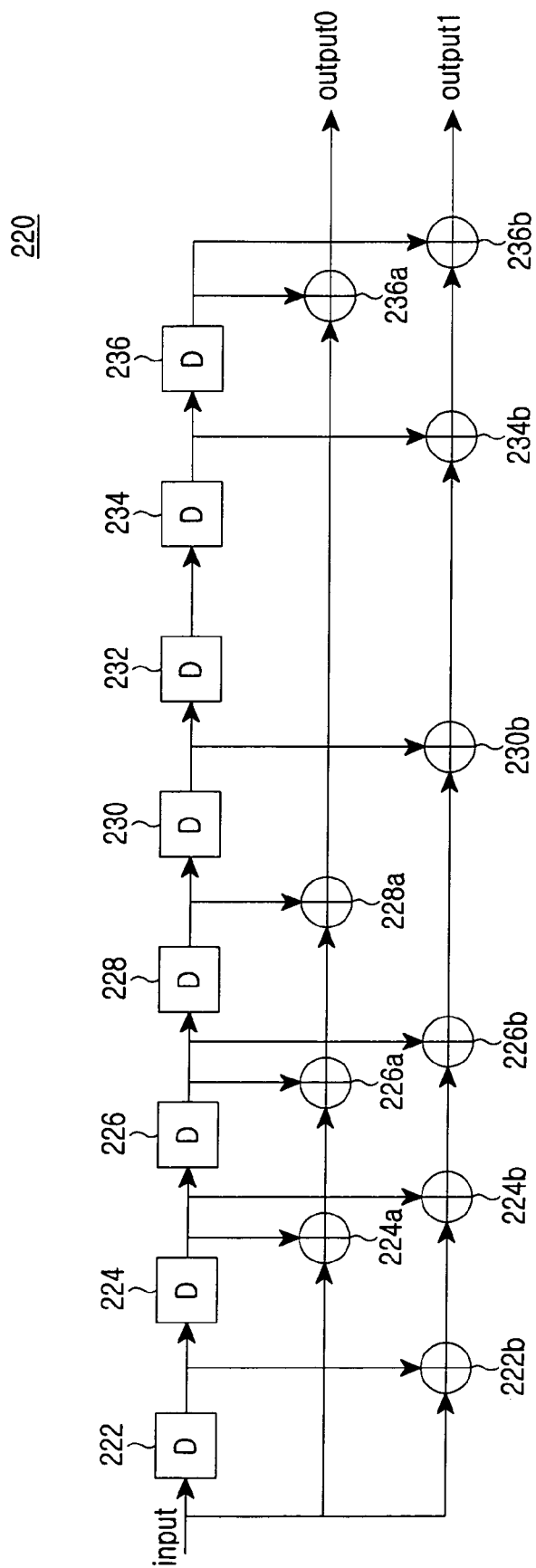

FIG. 2B illustrates a convolutional encoder with a constraint length of 9 and a coding rate of 1/2 defined in the 3GPP standards.

Referring to FIG. 2B, a convolutional encoder 220 includes eight serial shift registers 222, 224, 226, 228, 230, 232, 234 and 236 and a plurality of adders 222b, 224a, 224b, 226a, 226b, 228a, 230b, 234b, 236a and 236b for receiving input information bits or the outputs bits of the shift registers 222 to 236. Input information including eight tail bits being zeroes sequentially pass through the shift registers 222 to 236, starting from the first bit, and coded bits are produced in an order of output0, output1, output2, output0, output1, output2, . . . .

The channel-coded control information is delivered in a 2-ms TTI of the E-AGCH. If an SF of 256 and QPSK are applied to the E-AGCH, a total of 60 bits can be transmitted in the 2-ms TTI. Therefore, 2 bits (=58−60) are repeated or up to 8 bits (=68−60) are punctured from the coded control information of the E-AGCH. One thing to note herein is that in the case of a 6-bit AG, control information including the 6-bit AG, a 16-bit UE-ID specific CRC, and 8 tail bits is convolutionally encoded with a constraint length of 9 at a coding rate of 1/2 to 60 channel-coded bits. Since the number of transmittable bits in a 2-ms TTI is 60, there is no need for rate matching in this case.

The following exemplary embodiments of the present invention are intended to provide rate matching patterns which minimize the BLER performance of control information delivered on the E-AGCH. The seventh through eleventh exemplary embodiments of the present invention provide rate matching patterns and corresponding transmission and reception methods for a 5-bit AG, 7-bit AG, 8-bit AG, 9-bit AG and a 10-bit AG, respectively.

Exemplary Embodiment 7

A rate matching pattern for a 5-bit AG is provided as an example of an implementation of the present invention. For instance, the AG includes a 4-bit allowed maximum data rate representing the maximum amount of uplink radio resources available to a UE or a 4-bit power offset equivalent to the allowed maximum data rate and a 1-bit AG validity duration indicator indicating how long the AG is valid. Or the AG includes a 4-bit allowed maximum data rate or power offset and a 1-bit AG validity duration indicator indicating whether the AG is valid for one particular HARQ process or an entire HARQ process.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 21-bit control information with the 5-bit AG concatenated to the 16-bit UE-ID specific CRC and convolutionally encoded with a constraints length of 9 at a coding rate of 1/2. As a result, one channel-coded block being a 58-bit coded bit stream is produced. 2 bits of the 58-bit channel-coded block are repeated to match the size of the channel-coded block to a 2-ms E-AGCH TTI to which an SF of 256 and QPSK apply. Thus, a 60-bit rate-matched block is created. A rate matching pattern representing the positions of the repeated bits is simulated in a manner that decreases the change of BER at each bit position of the rate-matched block and thus improves BLER performance. The following rate matching pattern is available.

Rate matching pattern={23, 57}

The elements of the rate matching pattern represent the positions of bits to be repeated among the channel-coded bits #1 to #58. Given a 10-ms E-AGCH TTI, the 2-ms E-AGCH TTI occurs five times.

With reference to FIG. 3, a Node B transmitter for transmitting the E-AGCH according to the seventh exemplary embodiment of the present invention will be described.

Referring to FIG. 3, upon input of a 5-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 21-bit control information. The channel encoder 308, which uses a convolutional code with a constraint length of 9 and a coding rate 1/2, adds eight tail bits to the 21-bit control information and convolutionally encodes the 29-bit information to a 58-bit coded block.

The rate matcher 310 repeats the 58-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314. Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores the above rate matching pattern and applies it to the rate matcher 310.

With reference to FIG. 4, a UE receiver for receiving the E-AGCH according to the seventh exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. combines) the bits repeated by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into a 5-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

Exemplary Embodiment 8

A rate matching pattern for a 7-bit AG is provided as an example of an implementation of the present invention. For instance, the AG includes a 5-bit allowed maximum data rate representing the maximum amount of uplink radio resources available to a UE or a 5-bit power offset equivalent to the allowed maximum data rate, a 1-bit AG validity duration indicator indicating how long the AG is valid, and a 1-bit AG validity process indicator indicating whether the AG is valid for one particular HARQ process or an entire HARQ process. Or the AG includes a 6-bit allowed maximum data rate or power offset and a 1-bit AG validity duration indicator.

In a third example, the AG includes a 6-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of seven bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 23-bit control information with the 7-bit AG concatenated to the 16-bit UE-ID specific CRC and convolutionally encoded with a constraints length of 9 at a coding rate of 1/2. As a result, one channel-coded block being a 62-bit coded bit stream is produced. 2 bits are punctured from the 62-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching pattern is available.

Rate matching pattern={2, 62}

The elements of the rate matching pattern represent the positions of bits to be punctured among the channel-coded bits #1 to #62. Given a 10-ms E-AGCH TTI, the 2-ms E-AGCH TTI occurs five times.

With reference to FIG. 3, a Node B transmitter for transmitting the E-AGCH according to the eighth exemplary embodiment of the present invention will be described.

Referring to FIG. 3, upon input of a 7-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 23-bit control information. The channel encoder 308, which uses a convolutional code with a constraint length of 9 and a coding rate 1/2, adds eight tail bits to the 23-bit control information and convolutionally encodes the 31-bit information to a 62-bit coded block.

The rate matcher 310 punctures the 62-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314. Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores the above rate matching pattern and applies it to the rate matcher 310.

With reference to FIG. 4, a UE receiver for receiving the E-AGCH according to the eighth exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into a 7-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

Exemplary Embodiment 9

A rate matching pattern for an 8-bit AG is provided as an example of an implementation of the present invention. For instance, the AG includes a 6-bit allowed maximum data rate representing the maximum amount of uplink radio resources available to a UE or a 6-bit power offset equivalent to the allowed maximum data rate, a 1-bit AG validity duration indicator indicating how long the AG is valid, and a 1-bit AG validity process indicator indicating whether the AG is valid for one particular HARQ process or an entire HARQ process. Or the AG includes a 7-bit allowed maximum data rate or power offset and a 1-bit AG validity duration indicator.

In a third example, the AG includes a 7-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of eight bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 24-bit control information with the 8-bit AG concatenated to the 16-bit UE-ID specific CRC and convolutionally encoded with a constraints length of 9 at a coding rate of 1/2. As a result, one channel-coded block being a 64-bit coded bit stream is produced. 4 bits are punctured from the 64-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching patterns are available.

Rate matching pattern={2, 10, 60, 63} or {2, 6, 60, 63}

The elements of each of the rate matching patterns represent the positions of bits to be punctured among the channel-coded bits #1 to #64. Given a 10-ms E-AGCH TTI, the 2-ms E-AGCH TTI occurs five times.

With reference to FIG. 3, a Node B transmitter for transmitting the E-AGCH according to the ninth exemplary embodiment of the present invention will be described.

Referring to FIG. 3, upon input of an 8-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 24-bit control information. The channel encoder 308, which uses a convolutional code with a constraint length of 9 and a coding rate 1/2, adds eight tail bits to the 24-bit control information and convolutionally encodes the 32-bit information to a 64-bit coded block.

The rate matcher 310 punctures the 64-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314. Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores at least one of the above rate matching patterns and applies a preset one of the rate matching patterns to the rate matcher 310.

With reference to FIG. 4, a UE receiver for receiving the E-AGCH according to the ninth exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into an 8-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

Exemplary Embodiment 10

A rate matching pattern for a 9-bit AG is provided as an example of an implementation of the present invention. For instance, the AG includes a 7-bit allowed maximum data rate representing the maximum amount of uplink radio resources available to a UE or a 7-bit power offset equivalent to the allowed maximum data rate, a 1-bit AG validity duration indicator indicating how long the AG is valid, and a 1-bit AG validity process indicator indicating whether the AG is valid for one particular HARQ process or an entire HARQ process. Or the AG includes an 8-bit allowed maximum data rate or power offset and a 1-bit AG validity duration indicator.

In a third example, the AG includes an 8-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of nine bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 25-bit control information with the 9-bit AG concatenated to the 16-bit UE-ID specific CRC and convolutionally encoded with a constraints length of 9 at a coding rate of 1/2. As a result, one channel-coded block being a 66-bit coded bit stream is produced. 6 bits are punctured from the 66-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching patterns are available.

Rate matching pattern={1, 3, 7, 59, 63, 66} or {1, 4, 10, 59, 63, 66}

The elements of each of the rate matching patterns represent the positions of bits to be punctured among the channel-coded bits #1 to #66. Given a 10-ms E-AGCH TTI, the 2-ms E-AGCH TTI occurs five times.

With reference to FIG. 3, a Node B transmitter for transmitting the E-AGCH according to the tenth exemplary embodiment of the present invention will be described.

Referring to FIG. 3, upon input of a 9-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 25-bit control information.

The channel encoder 308, which uses a convolutional code with a constraint length of 9 and a coding rate 1/2, adds eight tail bits to the 25-bit control information and convolutionally encodes the 33-bit information to a 66-bit coded block. The rate matcher 310 punctures the 66-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314.

Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores at least one of the above rate matching patterns and applies a preset one of the rate matching patterns to the rate matcher 310.

With reference to FIG. 4, a UE receiver for receiving the E-AGCH according to the tenth exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (i.e. depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into a 9-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

Exemplary Embodiment 11

A rate matching pattern for a 10-bit AG is provided as an example of an implementation of the present invention. For instance, the AG includes an 8-bit allowed maximum data rate representing the maximum amount of uplink radio resources available to a UE or an 8-bit power offset equivalent to the allowed maximum data rate, a 1-bit AG validity duration indicator indicating how long the AG is valid, and a 1-bit AG validity process indicator indicating whether the AG is valid for one particular HARQ process or an entire HARQ process. Or the AG includes a 9-bit allowed maximum data rate or power offset and a 1-bit AG validity duration indicator.

In a third example, the AG includes a 9-bit allowed maximum data rate or power offset and a 1-bit AG validity process indicator. Or the AG is configured to include an allowed maximum data rate or power offset, an AG validity duration indicator, an AG validity process indicator, and other E-AGCH control bits in a total of ten bits.

Besides the AG, the E-AGCH carries a UE-ID for identifying a UE and a CRC for detecting errors from the AG. The UE-ID and the CRC each have 16 bits and modulo-2 operated on a bit basis. Thus they are transmitted in the form of a 16-bit CRC masked with the UE-ID. This 16-bit CRC is called a UE-ID specific CRC. The UE can determine whether a received AG is intended for the UE by the UE-ID specific CRC.

Eight tail bits are added to 26-bit control information with the 10-bit AG concatenated to the 16-bit UE-ID specific CRC and convolutionally encoded with a constraints length of 9 at a coding rate of 1/2. As a result, one channel-coded block being a 68-bit coded bit stream is produced. 8 bits are punctured from the 68-bit channel-coded block for transmission in a 2-ms E-AGCH TTI to which an SF of 256 and QPSK apply, creating a 60-bit rate-matched block. A rate matching pattern representing the positions of the punctured bits is simulated in a manner that decreases the change of BER at each bit position of the rate-matched block and thus improves BLER performance. The following rate matching patterns are available.

Rate matching pattern={1, 2, 3, 8, 49, 65, 67, 68} or {2, 5, 6, 10, 54, 59, 63, 68}

The elements of each of the rate matching patterns represent the positions of bits to be punctured among the channel-coded bits #1 to #68. Given a 10-ms E-AGCH TTI, the 2-ms E-AGCH TTI occurs five times.

With reference to FIG. 3, a Node B transmitter for transmitting the E-AGCH according to the eleventh exemplary embodiment of the present invention will be described.

Referring to FIG. 3, upon input of a 10-bit AG 302, the UE-ID specific CRC adder 304 creates a 16-bit CRC from the AC, generates a UE-ID specific CRC by modulo-2 operating the 16-bit CRC with a 16-bit UE-ID for identifying the UE to receive the AG, and then combines the UE-ID specific CRC with the AG, thereby producing 26-bit control information. The channel encoder 308, which uses a convolutional code with a constraint length of 9 and a coding rate 1/2, adds eight tail bits to the 26-bit control information and convolutionally encodes the 34-bit information to a 68-bit coded block.

The rate matcher 310 punctures the 68-bit coded block in a predetermined rate matching pattern. The physical channel mapper 312 maps the rate-matched block to a physical channel frame configured to be suitable for 2-ms E-AGCH TTIs. Thus, the control information is transmitted on the E-AGCH 314. Meanwhile, the control information transmission controller 316 controls transmission of the control information for an E-DCH through the UE-ID specific CRC adder 304, the channel encoder 308, the rate matcher 310, and the physical channel mapper 312. The control information transmission controller 316 stores at least one of the above rate matching patterns and applies a preset one of the rate matching patterns to the rate matcher 310.

With reference to FIG. 4, a UE receiver for receiving the E-AGCH according to the eleventh exemplary embodiment of the present invention will be described.

Referring to FIG. 4, the UE receives a signal on the E-AGCH 402. The physical channel demapper 404 extracts a rate-matched block from a 2-ms TTI in the received signal. The rate dematcher 406 recovers (that is, depunctures) the bits punctured by the rate matcher 310 for the rate-matched block according to the rate matching pattern used in the rate matcher 310 of the Node B. If the E-AGCH 402 uses a 10-ms TTI with five repeated 2-ms TTIs, the physical channel demapper 404 and the rate dematcher 406 perform the same operation five times and combine the resulting coded sub-blocks to one coded block.

The channel decoder 408 decodes the coded block received from the rate dematcher 406. The coded block is divided into a 10-bit AG and a 16-bit UE-ID specific CRC. The UE-ID specific CRC extractor 410 extracts a 16-bit CRC by modulo-2 operating the 16-bit UE-ID specific CRC with the 16-bit UE-ID 412 of the UE, and provides the extracted CRC and the AG to the CRC checker 414. The CRC checker 414 checks the 16-bit CRC to detect errors from the AG. If the CRC check passes, the CRC checker 414 outputs the error-free AG 416. The AG 416 is used for determining an allowed maximum data rate for E-DCH data. If the CRC check fails, the AG is discarded.

Meanwhile, the control information reception controller 418 controls the reception of the control information for the E-DCH through the physical channel demapper 404, the rate dematcher 406, the channel decoder 408, the UE-ID specific CRC extractor 410, and the CRC checker 414.

As described above, certain exemplary embodiments of the present invention may increase the transmission reliability of an AG indicating the absolute value of an allowed maximum data rate for a UE by providing a rate matching pattern that reduces a BER variation at each bit position within a block and thus may improve BLER performance. In addition, lower power consumption may be required for the same BLER performance and as a result, uplink interference may be reduced.

While the invention has been shown and described with reference to certain exemplary embodiments thereof, it will be understood by those of ordinary skill in the art that various changes in form and details may be made therein without departing from the spirit and scope of the invention as defined by the appended claims.

What is claimed is:

1. A method of transmitting control information associated with uplink packet data transmission in a mobile communication system, the method comprising the steps of:

generating a 16-bit user equipment identifier (UE-ID) specific cyclic redundancy check (CRC) by combining a CRC generated for detecting errors from the control information with a UE-ID for identifying a user equipment (UE) to receive the control information;

generating 90 coded bits by adding the UE-ID specific CRC and 8 tails bits to 6-bit control information and encoding the added bits at a coding rate of 1/3;

generating a 60-bit rate-matched block by rate-matching the coded bits according to a rate matching pattern representing positions of bits to be punctured among the coded bits; and transmitting the rate-matched block to the UE, wherein the rate matching pattern comprises {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

2. The method of claim 1, wherein the control information comprises an indication of an allowed maximum data rate for transmission of uplink packet data from the UE.

3. The method of claim 2, wherein the control information comprises a 5-bit power offset equivalent to the allowed maximum data rate and a 1-bit validity process indicator indicating whether the control information is valid for an entire hybrid automatic repeat request (HARQ) process.

4. The method of claim 1, wherein the UE-ID specific CRC generating step comprises the step of generating the UE-ID specific CRC by modulo-2 operating a 16-bit CRC with a 16-bit UE ID.

5. An apparatus of transmitting control information associated with uplink packet data transmission in a mobile communication system, the apparatus comprising:

a user equipment identifier (UE-ID) specific cyclic redundancy check (CRC) generator for generating a 16-bit UE-ID specific CRC by combining a CRC generated for detecting errors from the control information, with a UE-ID for identifying a UE to receive the control information;

a channel encoder for generating 90 coded bits by adding the UE-ID specific CRC and 8 tails bits to 6-bit control information and encoding the added bits at a coding rate of 1/3;

a rate matcher for generating a 60-bit rate-matched block by rate-matching the coded bits, according to a rate matching pattern, representing positions of bits to be punctured among the coded bits; and a physical channel mapper for transmitting the rate-matched block to the UE, wherein the rate matching pattern comprises {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

6. The apparatus of claim 5, wherein the control information comprises an indication of an allowed maximum data rate for transmission of uplink packet data from the UE.

7. The apparatus of claim 6, wherein the control information comprises a 5-bit power offset equivalent to the allowed maximum data rate and a 1-bit validity process indicator indicating whether the control information is valid for an entire hybrid automatic repeat request (HARQ) process.

8. The apparatus of claim 5, wherein the UE-ID specific CRC is generated by modulo-2 operating a 16-bit CRC with a 16-bit UE ID.

9. A method of receiving control information associated with uplink packet data transmission in a mobile communication system, comprising the steps of:

extracting a 60-bit rate-matched block from a signal received from a Node B;

generating 90 coded bits by rate-dematching the rate-matched block according to a rate matching pattern representing positions of bits to be depunctured;

generating 6-bit control information and a 16-bit user equipment identifier (UE-ID) specific cyclic redundancy check (CRC) by decoding the coded bits at a coding rate of 1/3; and outputting the control information by checking the UE-ID specific CRC, wherein the rate matching pattern comprises {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

10. The method of claim 9, wherein the control information comprises an indication of an allowed maximum data rate for transmission of uplink packet data.

11. The method of claim 10, wherein the control information comprises a 5-bit power offset equivalent to the allowed maximum data rate and a 1-bit validity process indicator indicating whether the control information is valid for an entire hybrid automatic repeat request (HARQ) process.

12. The method of claim 9, wherein the UE-ID specific CRC is generated by modulo-2 operating a 16-bit CRC with a 16-bit UE ID.

13. An apparatus for receiving control information associated with uplink packet data transmission in a mobile communication system, the apparatus comprising:

a physical channel demapper for extracting a 60-bit rate-matched block from a signal received from a Node B;

a rate dematcher for generating 90 coded bits by rate-dematching the rate-matched block according to a rate matching pattern representing positions of bits to be depunctured;

a channel decoder for generating 6-bit control information and a 16-bit user equipment identifier (UE-ID) specific cyclic redundancy check (CRC) by decoding the coded bits at a coding rate of 1/3; and a CRC checker for outputting the control information by checking the UE-ID specific CRC, wherein the rate matching pattern comprises {1, 2, 5, 6, 7, 11, 12, 14, 15, 17, 23, 24, 31, 37, 44, 47, 61, 63, 64, 71, 72, 75, 77, 80, 83, 84, 85, 87, 88, 90}.

14. The apparatus of claim 13, wherein the control information comprises an indication of an allowed maximum data rate for transmission of uplink packet data.

15. The apparatus of claim 14, wherein the control information comprises a 5-bit power offset equivalent to the allowed maximum data rate and a 1-bit validity process indicator indicating whether the control information is valid for an entire hybrid automatic repeat request (HARQ) process.

16. The apparatus of claim 13, wherein the UE-ID specific CRC is generated by modulo-2 operating a 16-bit CRC with a 16-bit UE ID.

* * * * *